(12) United States Patent
    Takei

(10) Patent No.: US 9,630,453 B2
(45) Date of Patent: Apr. 25, 2017

(54) PNEUMATIC TIRE

(71) Applicant: BRIDGESTONE CORPORATION, Chuo-ku, Tokyo (JP)

(72) Inventor: Ataka Takei, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 235 days.

(21) Appl. No.: 14/389,951

(22) PCT Filed: Apr. 2, 2013

(86) PCT No.: PCT/JP2013/002292
§ 371 (c)(1),
(2) Date: Oct. 1, 2014

(87) PCT Pub. No.: WO2013/150783
PCT Pub. Date: Oct. 10, 2013

(65) Prior Publication Data
US 2015/0059942 A1    Mar. 5, 2015

(30) Foreign Application Priority Data
Apr. 5, 2012    (JP) ................................ 2012-086456

(51) Int. Cl.
*B60C 11/01*    (2006.01)
*B60C 11/117*    (2006.01)
(Continued)

(52) U.S. Cl.
CPC .......... *B60C 11/01* (2013.01); *B60C 11/0302* (2013.04); *B60C 11/1376* (2013.04); *B60C 11/1236* (2013.04); *B60C 2011/0388* (2013.04)

(58) Field of Classification Search
CPC ............... B60C 11/01; B60C 2011/013; B60C 11/1376; B60C 11/0302;
(Continued)

(56) References Cited

U.S. PATENT DOCUMENTS 2,240,542 A * 5/1941 Bourdon ................. B60C 11/01
152/209.15
5,386,861 A    2/1995 Overhoff et al.
(Continued)

FOREIGN PATENT DOCUMENTS

CN    101462469 A    6/2009
CN    101654044 A    2/2010
(Continued)

OTHER PUBLICATIONS

JP 2005-231420, Sep. 2005, English language machine translation [http://www.epo.org].*
(Continued)

*Primary Examiner* — Eric Hug
(74) *Attorney, Agent, or Firm* — Sughrue Mion, PLLC

(57) ABSTRACT

Provided is a pneumatic tire used with a specified rotation direction, including a tread, a pair of sidewalls extending continuously from the tread inward in a tire radial direction, a pair of beads continuous with the sidewalls inward in the tire radial direction, and at least one ridge on a buttress surface. The buttress surface extends from a tread edge of a tread surface formed on the tread to the sidewall. The ridge extends from a sidewall side of the buttress surface towards the tread edge and terminates before reaching the tread edge. The ridge includes a steeply inclined surface, having a high gradient with respect to the buttress surface, inclined forwards in the rotation direction, and a moderately inclined surface, having a more moderate gradient than the steeply inclined surface, inclined backwards in the rotation direction.

4 Claims, 4 Drawing Sheets

(51) Int. Cl.
  *B60C 11/03* (2006.01)
  *B60C 11/13* (2006.01)
  *B60C 11/12* (2006.01)

(58) Field of Classification Search
  CPC ......... B60C 2011/0388; B60C 11/1236; B60C 13/02; B60C 2011/0313; B60C 11/0311; B60C 11/04
  USPC .................. 152/209.16, 209.15, 209.28, 523
  See application file for complete search history.

(56) References Cited

U.S. PATENT DOCUMENTS

| | | | |
|---|---|---|---|
| 6,533,007 | B1 | 3/2003 | McMannis |
| 8,069,889 | B2 | 12/2011 | Sakamoto |
| 2009/0159166 | A1 | 6/2009 | Sakamoto |
| 2010/0043934 | A1 | 2/2010 | Harvey |

FOREIGN PATENT DOCUMENTS

| EP | 0205233 | * | 4/1986 |
|---|---|---|---|
| FR | 782332 A | | 6/1935 |
| JP | 5-238210 A | | 9/1993 |
| JP | 5-238211 A | | 9/1993 |
| JP | 7-329510 A | | 12/1995 |
| JP | 11291718 A | | 10/1999 |
| JP | 2003-211915 | * | 7/2003 |
| JP | 2003-211915 A | | 7/2003 |
| JP | 2004-291938 A | | 10/2004 |
| JP | 2005-231420 | * | 9/2005 |
| JP | 2009-149181 A | | 7/2009 |
| JP | 2010-13089 A | | 1/2010 |
| JP | 2010-188975 | * | 9/2010 |
| JP | 2010188975 A | | 9/2010 |

OTHER PUBLICATIONS

JP 2010-188975, Sep. 2010, English language machine translation [http://www.epo.org].*

Communication dated Oct. 8, 2013, issued by the Japan Patent Office in corresponding Japanese Application No. 2012-086456.

Communication dated Oct. 28, 2015 from the European Patent Office in counterpart application No. 13772532.1.

International Search Report for PCT/JP2013/002292 dated Jul. 9, 2013 [PCT/ISA/210].

* cited by examiner

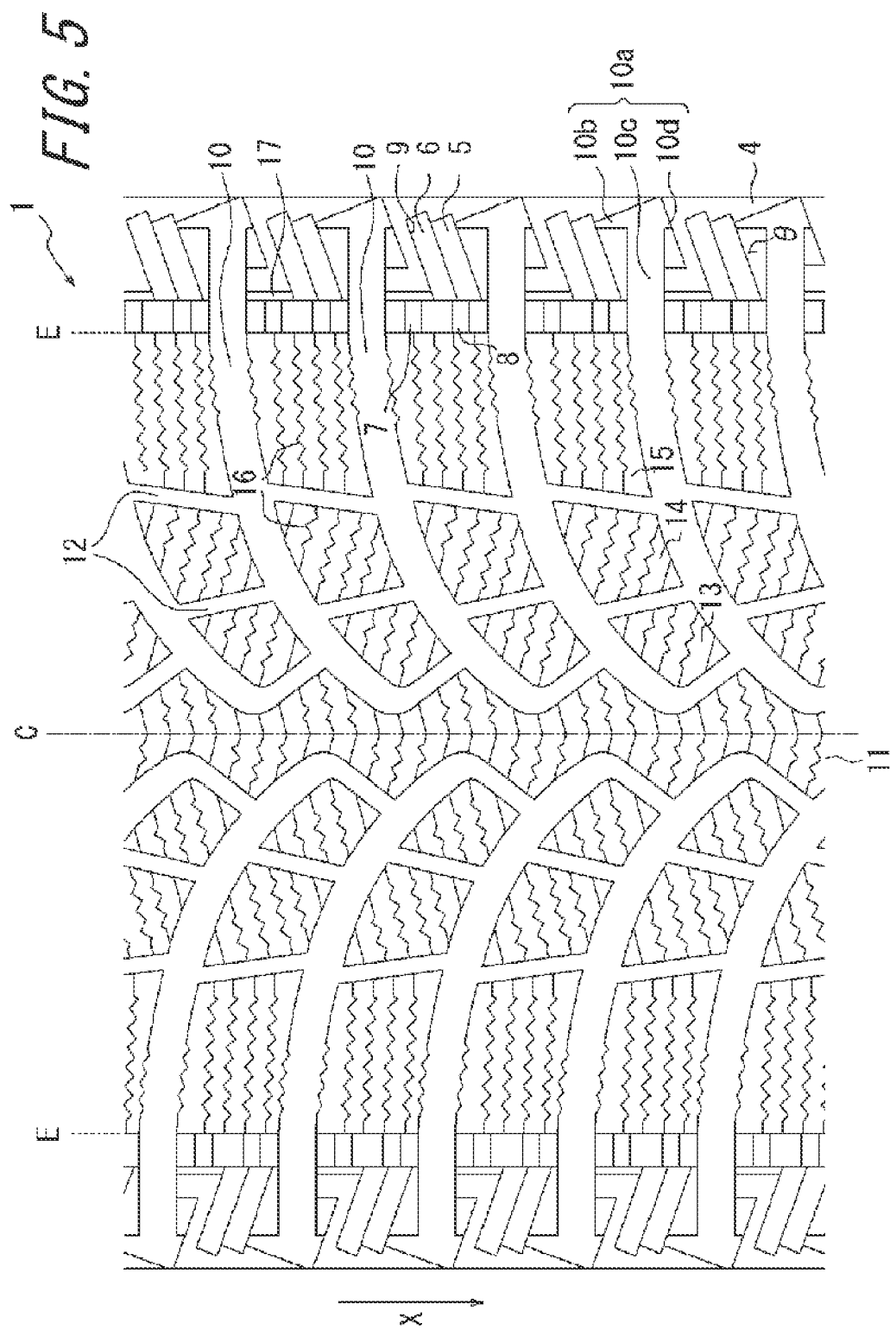

PNEUMATIC TIRE

CROSS REFERENCE TO RELATED APPLICATIONS

This application is a National Stage of International Application No. PCT/JP2013/002292, filed on Apr. 2, 2013, which claims priority from Japanese Patent Application No. 2012-086456, filed on Apr. 5, 2012, the contents of all of which are incorporated herein by reference in their entirety.

TECHNICAL FIELD

The present invention relates to a pneumatic tire that includes a tread, a pair of sidewalls extending continuously from the tread inward in the tire radial direction, and a pair of beads continuous with the sidewalls inward in the tire radial direction.

BACKGROUND ART

There is a desire that a pneumatic radial tire for heavy load vehicles, such as a truck or bus, that is capable of being used on icy and snowy roads will achieve a predetermined driving performance, such as traction performance, in particular while being driven on roads with deep snow, such that the tire is buried in snow reaching the buttress located between the tread and the sidewall.

It has thus been proposed, as in PTL 1, to form for example a plurality of ridges on the buttress surface projecting from the buttress surface and extending in the tire radial direction from the sidewall to the tread edge. The traction performance when driving on snowy roads is improved upon the buttress surface contacting the snow surface due to a traction effect achieved by the ridges with respect to the snow surface, i.e. a so-called edge effect.

In the pneumatic tire disclosed in PTL 1, "the shoulder block has formed thereon a ridge and a square portion, the ridge projecting from the buttress surface in the tire axial direction and including a tapered face on the ground contact side continuous with the ground contact area of the shoulder block, and the square portion including a stepwise tread edge at the front and back of the ridge in the circumferential direction". According to this pneumatic tire, "when driving in wheel tracks on snowy roads or the like, the opposing force is reduced by the tapered face first aligning with the road surface of the wheel track, and new traction is yielded by the scratching and scraping effect due to the side that faces the direction of travel in the ridge projecting from the buttress surface. Traction is also yielded by the stepwise square portion".

CITATION LIST

Patent Literature

PTL 1: JP H7-329510A

SUMMARY OF INVENTION

Technical Problem

In the tire disclosed in PTL 1, the ridge provided on the buttress surface extends from the sidewall side to the tread edge. Therefore, a problem occurs in that when the tire rotates with a load applied thereon, if for example a crack occurs on the tread surface in a land portion region or the like near the tread edge due to the tire running over a rock or other protrusion on the road, then as the tire is used, the crack easily grows to the sidewall via the border region between the ridge that extends to the tread edge and the contiguous buttress surface or the like. As a result, tire failure may occur.

The present invention overcomes such a problem with conventional techniques and provides a pneumatic tire that, by providing a ridge on the buttress surface, can effectively improve on-snow traction performance while preventing a crack that occurs in the tread surface from growing to the sidewall.

Solution to Problem

A pneumatic tire according to the present invention is used with a specified rotation direction and includes a tread, a pair of sidewalls extending continuously from the tread inward in a tire radial direction, a pair of beads continuous with the sidewalls inward in the tire radial direction, and at least one ridge on a buttress surface. The buttress surface extends from a tread edge of a tread surface formed on the tread to the sidewall. The ridge extends from a sidewall side of the buttress surface towards the tread edge and terminates before reaching the tread edge. The ridge includes a steeply inclined surface, having a high gradient with respect to the buttress surface, inclined forwards in the rotation direction, and a moderately inclined surface, having a more moderate gradient than the steeply inclined surface, inclined backwards in the rotation direction.

In the above tire, the "tread surface" refers to the portion of the tire that contacts with a flat plate when the tire is mounted on an applicable rim, with specified pressure applied, and then placed perpendicularly on the flat plate while at rest with a load corresponding to the maximum load capability applied. The "tread edge" refers to the outermost position of the tread surface in the tire width direction.

As used herein, an "applicable rim" refers to a rim specified by the standards below in accordance with tire size, "specified pressure" refers to air pressure specified by the standards below in accordance with the maximum load capability, and the "maximum load capability" refers to the maximum mass that the tire is allowed to bear according to the standards below.

The standards are determined by valid industrial standards for the region in which the tire is produced or used, such as "The Tire and Rim Association, Inc. Year Book" in the United States of America, "The European Tyre and Rim Technical Organisation Standards Manual" in Europe, and the "JATMA Year Book" of the Japan Automobile Tire Manufacturers Association in Japan.

BRIEF DESCRIPTION OF DRAWINGS

The present invention will be further described below with reference to the accompanying drawings, wherein:

FIG. 5 is a partial development view illustrating the tread pattern of the tire in FIG. 1.

DESCRIPTION OF EMBODIMENTS

Embodiments of the present invention will be described based on the drawings.

Figure 1:
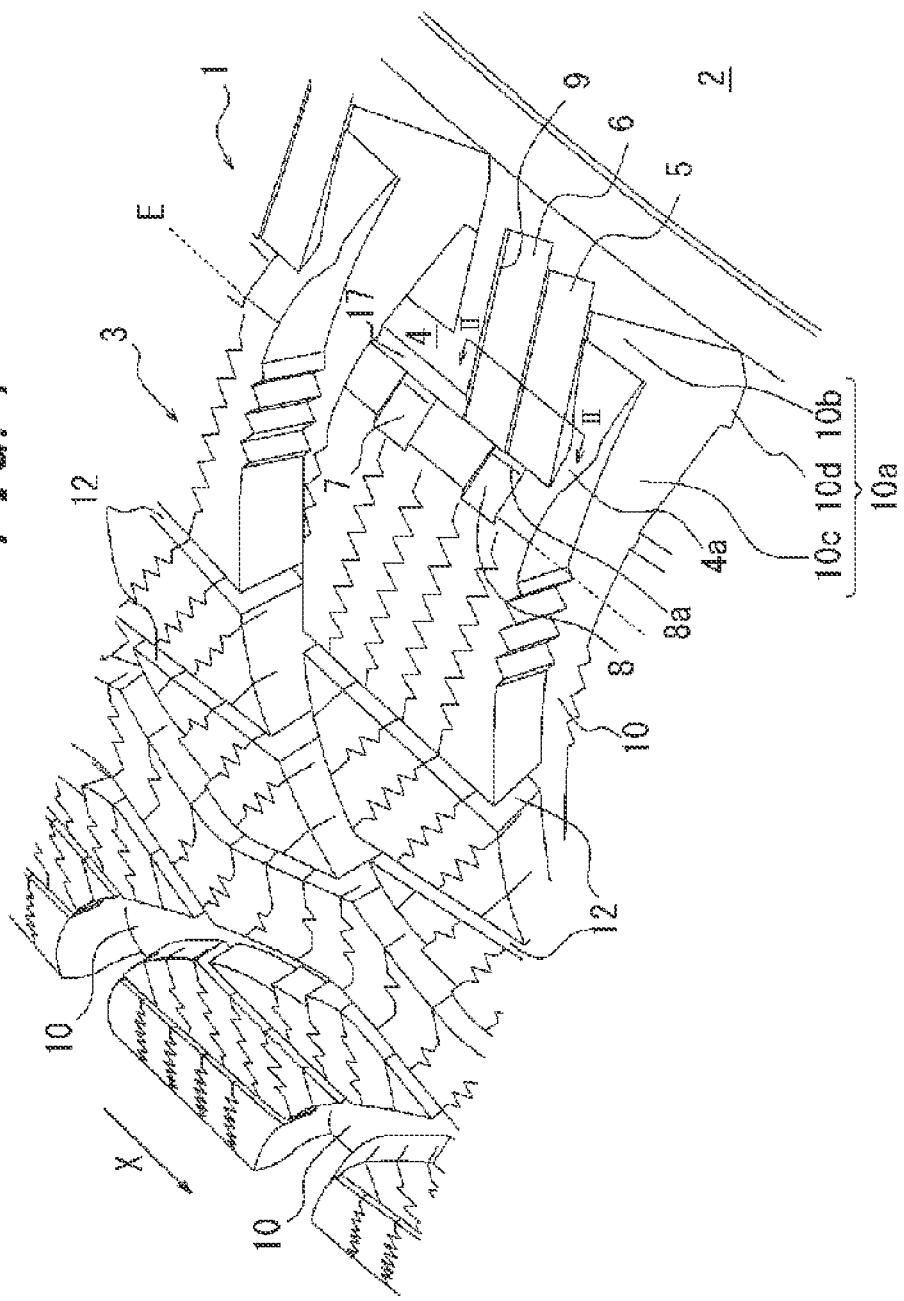
FIG. 1 is a partial perspective view of the buttress in an embodiment of a pneumatic tire according to the present invention.

In FIG. 1, the tread of a tire in an embodiment of the present invention is labeled 1, one of a pair of sidewalls respectively extending continuously from the sides of the tread 1 inward in the tire radial direction is labeled 2, and the tread surface formed on the tread 1 is labeled 3.

While details are omitted from the figures, in addition to the tread 1 and the sidewalls 2, this pneumatic tire also includes, like a regular tire, a pair of beads continuous with the sidewalls 2 inward in the tire radial direction, a carcass on the inside extending toroidally between the pair of beads, the carcass for example being radially constructed, and a belt, tread rubber, and the like provided on the outside of the carcass in the tire radial direction.

In the present embodiment, at least one ridge is provided on a buttress surface 4, in this case two ridges 5 and 6 aligned and adjacent in the tread circumferential direction, each ridge extending linearly, for example, from a sidewall 2 side of the buttress surface 4 towards a tread edge E that is the outermost edge of the tread surface 3 in the tire width direction. The buttress surface 4 is a tire outer surface region between the tread edge E and the outermost position of the sidewall 2 in the tire radial direction.

An edge effect due to such ridges 5 and 6 is achieved at the buttress surface 4, which may be buried in snow for example when driving on roads with deep snow, and by forming these ridges 5 and 6, this edge effect improves the traction performance on snowy roads. Note that one ridge or three or more aligned ridges may also be provided. Each ridge may curve while extending from the sidewall 2 side towards the tread edge E, or may bend at one or more locations. Each ridge may also extend in a zigzag manner or the like.

In the present invention, when the tire rotates with load applied thereon, a crack may form at a location such as a land portion surface of the tread surface 3 by the tread edge E or the groove bottom of a sipe formed in the land portion surface, due for example to the tread surface 3 running over a protrusion on the road surface. In order to suppress such a crack from growing to the sidewall 2, the ridges 5 and 6 that extend towards the tread edge E terminate before reaching the tread edge E, as illustrated in the drawings.

In this way, by the ridges 5 and 6 not reaching the tread edge E, the growth of the above-described crack to the sidewall 2 can be halted in the region of the buttress surface 4 by the tread edge E where the ridges 5 and 6 do not exist, thereby preventing tire failure due to a crack reaching the surface of the sidewall 2.

In the embodiment illustrated in FIG. 1, at least one concavity is provided on the buttress surface 4, two concavities 7 and 8 in FIG. 1, in a region adjacent to the tread edge E. Each concavity is recessed towards the inside of the tread 1 from the buttress surface 4 and opens to the tread surface 3. By providing these concavities 7 and 8, the on-snow traction performance can be further improved based on the edge effect achieved by the concavities 7 and 8 and on the snow column shear force due to the snow packed into the concavities 7 and 8. Note that one concavity or three or more concavities may also be provided, yet the concavity is not an essential feature in the present invention.

As illustrated in the figures, the concavities 7 and 8 are preferably provided independently from the ridges 5 and 6, since doing so effectively suppresses a crack, which may occur in the concavities 7 and 8 due to tire use, from growing to the sidewall 2 and also yields a snow column shear force due to snow in the concavities 7 and 8 independently of the snow column shear force at the ridges 5 and 6, thereby greatly contributing to an improvement in the on-snow traction performance.

In this case, the concavity 8 is provided independently from the ridges 5 and 6. Therefore, a step 8a smoothly connecting the bottom of the concavity 8 to the buttress surface 4 or the ridges 5 and 6, as illustrated in FIG. 1, a portion 4b of the buttress surface, as illustrated in the expanded view in FIG. 2, or a narrow groove or the like, not illustrated in the figures, exists between the concavity 8 and the ridges 5 and 6. In the present embodiment, by shifting the position at which the concavity 7 is formed in the tire circumferential direction from the positions of the ridges 5 and 6, the concavity 7 becomes independent from the ridges 5 and 6.

Figure 2:
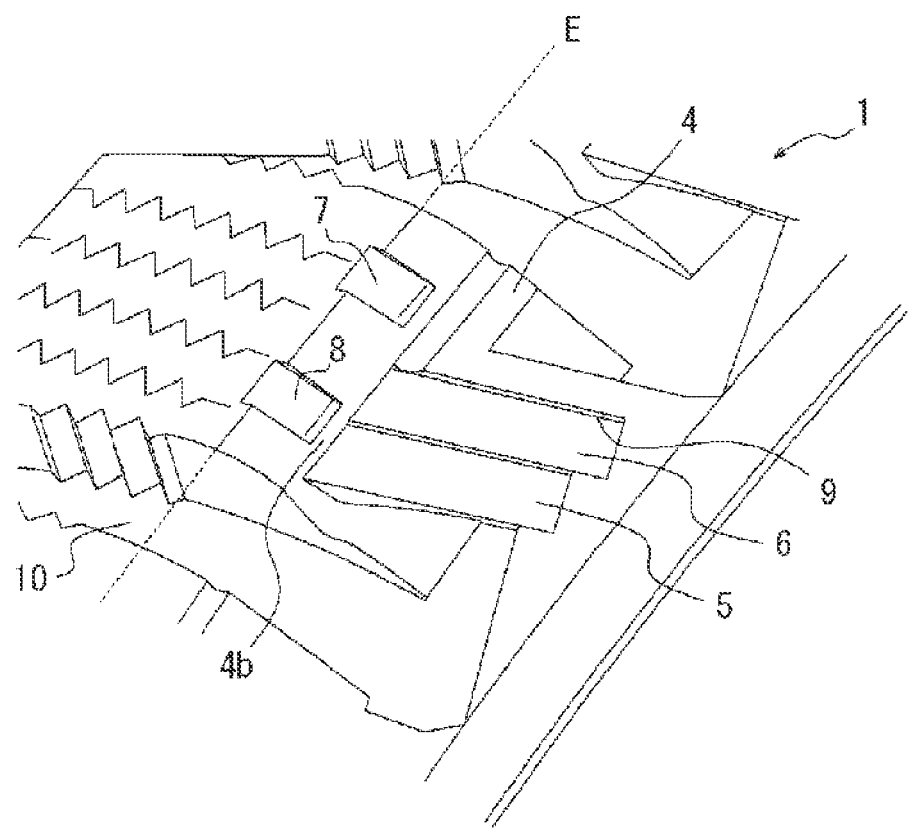
FIG. 2 is an expanded perspective view of the main parts of another embodiment of a pneumatic tire according to the present invention.

FIG. 2 illustrates the two concavities 7 and 8 adjacent in the tread circumferential direction as being separated from each other in the tread circumferential direction, and in a region towards the tread edge E from the ridges 5 and 6, a land portion is located between the two concavities 7 and 8 and is connected in the tread circumferential direction to other land portions between the concavities 7 and 8 and the below-described lug grooves via the portion 4b of the buttress surface. This structure is preferable in that it more effectively prevents the growth of cracks.

The tire according to the present invention is used with a specified rotation direction by attaching the tire to a vehicle so that, when the vehicle moves forward, the tire rotates in the direction indicated by the arrow X in FIG. 1. In such a type of tire, in which a different function is achieved depending on the rotation direction, an engraving or other indicia, not illustrated, may be provided on the sidewall surface or the like in order to specify the rotation direction (the direction of the arrow X in FIG. 1).

Figure 3:
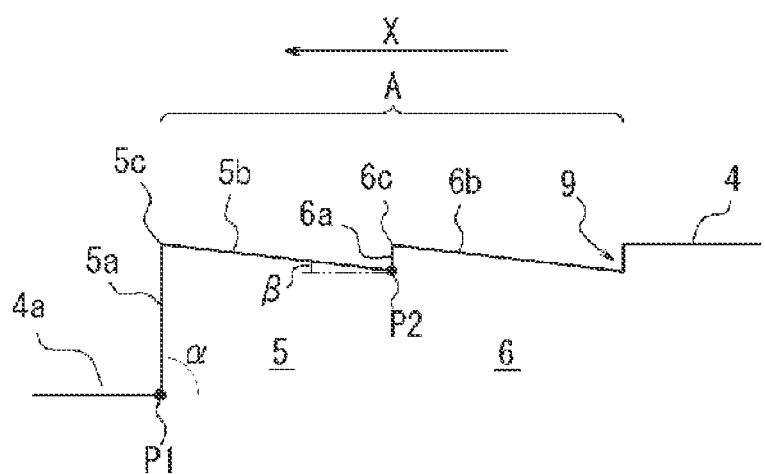
FIG. 3 is a cross-sectional view of ridges along the line II-II in FIG. 1.

As illustrated in the cross-section in FIG. 3, when the ridges 5 and 6 include steeply inclined surfaces 5a and 6a, with a high gradient with respect to the buttress surface 4, inclined forwards in the rotation direction X (to the left in FIG. 3) more than the buttress surface 4, and moderately inclined surfaces 5b and 6b, with a more moderate gradient than the steeply inclined surfaces 5a and 6a, inclined backwards in the rotation direction X (to the right in FIG. 3), then in accordance with the rotation direction of the tire, the on-snow traction performance can be further improved, and on-snow floating performance, which facilitates the tire becoming unstuck when buried in the snow, can be improved.

The steepness of the gradients in the moderately inclined surfaces 5b and 6b and the steeply inclined surfaces 5a and 6a is a relative comparison. For example, in the illustrated embodiment, the moderately inclined surfaces 5b and 6b have a moderate gradient with respect to the buttress surface 4 as compared to the steeply inclined surfaces 5a and 6a that are inclined at an angle of 90° with respect to the buttress surface 4.

In the ridges 5 and 6 in the present embodiment, the steeply inclined surfaces 5a and 6a and the moderately inclined surfaces 5b and 6b are flat and are connected, and apices 5c and 6c are formed where the steeply inclined surfaces 5a and 6a and the moderately inclined surfaces 5b and 6b intersect in the cross-sectional diagram along the tread circumferential direction.

With such ridges 5 and 6 provided on the buttress surface 4, when driving on roads with deep snow, an edge effect is achieved by the apices 5c and 6c of the ridges 5 and 6 on the buttress surface 4, which may be buried in the snow, and moreover a large snow column shear force is also achieved due to snow caught and packed at the front, in the rotation direction X, of the steeply inclined surfaces 5a and 6a with a steep gradient. Hence, the on-snow traction performance can be effectively improved. The required edge effect can be achieved even if the apices 5c and 6c are curved with a relatively small radius of curvature in the illustrated cross-section along the tread circumferential direction.

When the tire is buried in deep snow and gets stuck, then by rotating the tire in the opposite direction from the rotation direction X, a reduction in the on-snow floating performance derived from providing the ridges on the buttress surface 4 is suppressed under a small resistance of the ridges 5 and 6 to surrounding snow due to the moderate gradient of the moderately inclined surfaces 5b and 6b. It is thus easy for the tire to become unstuck. In other words, when the sides of the ridges facing backwards in the rotation direction X have a steep gradient, then upon rotating the tire in the opposite direction from the rotation direction X when the tire is stuck, the sides of the ridges facing backwards in the rotation direction X greatly resist the snow surface, and a force acts in a direction to drag and bury the tire further into the snow, thereby possibly leading to a reduction in the on-snow floating performance.

In the present embodiment, as illustrated in FIG. 3, the above-described ridges 5 and 6 are provided in a surface region A of the buttress surface 4 that is a portion of the buttress surface 4 further inward (downward in FIG. 3) in the tire width direction, with a step portion 9 therebetween, and at the front of the steeply inclined surface 5a in the rotation direction X, a concavity portion 4a that is recessed inward in the tire width direction with respect to the buttress surface 4 is formed. When driving on roads with deep snow as described above, this structure as well increases the edge effect and the snow column shear force at the buttress surface 4, thus contributing to improving the on-snow traction performance. This structure, however, is not essential in the present invention.

Figure 4:
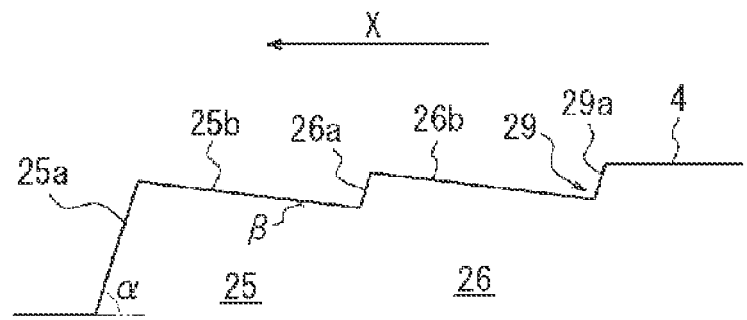
FIG. 4 is a similar cross-sectional view as FIG. 3, illustrating a modification to the ridges.

In the ridges 5 and 6 illustrated in FIG. 3, an angle of inclination α of each of the steeply inclined surfaces 5a and 6a with respect to the buttress surface 4 is 90°, yet it suffices for the angle of inclination α to be larger than an angle of inclination β of the moderately inclined surfaces 5b and 6b with respect to the buttress surface 4. Therefore, for example as illustrated in FIG. 4, ridges 25 and 26 having steeply inclined surfaces 25a and 26a for which the angle of inclination α is less than 90° may also be formed on the buttress surface 4. As illustrated in FIG. 3, in the illustrated cross-section along the tire circumferential direction, the angle of inclination α refers to the angle that is less than 180° between the steeply inclined surface 5a of the ridge 5 and a virtual line that traverses an edge point P1 of the steeply inclined surface 5a at the bottom of FIG. 3, extends into the ridge 5, and is parallel to the buttress surface 4. The angle of inclination β is similarly defined.

In the illustration in FIG. 4, a step face 29a of a step portion 29 from the buttress surface 4 also has an angle of inclination with respect to the buttress surface 4 of less than 90°.

The angle of inclination α of the steeply inclined surfaces 5a and 6a with respect to the buttress surface 4 may, for example, be from 70° to 100°. Assuming that the similar angle of inclination β of the moderately inclined surfaces 5b and 6b is smaller than the angle of inclination α of the steeply inclined surfaces 5a and 6a, the angle of inclination β may, for example, be from 5° to 30°. When measuring the angles of inclination α and β, the tire is mounted on an applicable rim, specified pressure is applied, and no load is applied.

In the illustrated embodiment, the angle of inclination α is equivalent for both of the steeply inclined surfaces 5a and 6a, and the angle of inclination β is also equivalent for both of the moderately inclined surfaces 5b and 6b. Although omitted from the drawings, the angle of inclination of the steeply inclined surfaces and/or the angle of inclination of the moderately inclined surfaces of ridges adjacent in the tire circumferential direction may differ.

In order to further increase the above-described snow column shear force achieved by the ridges 5 and 6, in a side view of the tire, the portion of the ridges 5 and 6 towards the tread edge E is preferably inclined forwards in the rotation direction X with respect to the tire radial direction.

In other words, when the ridges 5 and 6 extend in the tire radial direction and a portion of the ridges 5 and 6 by the tread edge E is inclined away from the rotation direction X, then when driving on roads with deep snow, snow that accumulates at the front, in the rotation direction X, of the steeply inclined surfaces 5a and 6a of the ridges 5 and 6 easily escapes towards the tread edge E as the tire rotates, causing the risk of a sufficient snow column shear force not being obtained at the ridges 5 and 6.

Such an angle of inclination θ of the portion of the ridges 5 and 6 towards the tread edge E with respect to the tire radial direction so that the portion faces forwards in the rotation direction X is, for example, preferably from 10° to 30° in the above-described state with no load applied to the tire.

In the embodiment illustrated in FIG. 1, a plurality of lug grooves 10 are formed on the tread surface 3, as illustrated by the development view of the tread pattern in FIG. 5. The lug grooves 10 extend towards the tire equatorial plane C while being inclined with respect to the tread circumferential direction, curve by turning back before reaching the tire equatorial plane C to form a bow, and then extend towards the tread edge E until reaching the tread edge E. The lug grooves 10 are aligned in the tread circumferential direction and connected with each other so as to define a center rib 11 extending continuously in the tread circumferential direction along the tire equatorial plane C. By providing such lug grooves 10, the center rib 11 extends in a zigzag manner in the tread circumferential direction at the sides of the lug grooves 10 and is defined by the zigzag circumferential groove portions of the lug grooves 10.

In the illustrated pattern, in each land portion defined between a plurality of lug grooves 10, two linear communication grooves 12 opening into each of the lug grooves 10 adjacent in the tread circumferential direction are provided at inclinations with respect to the tread circumferential direction, so that the distance between the communication grooves 12 increases towards the top of the figure. The communication grooves 12 divide each land portion located between a plurality of lug grooves 10 in the tread width direction into three blocks 13 to 15, i.e. so as to form a center block 13 towards the tire equatorial plane C, a shoulder block 15 towards the tread edge E, and an intermediate block 14 therebetween.

On the center rib 11 and on each of the blocks 13 to 15, a plurality of linear or at least partially zigzagging sipes 16 opening, on at least one side, to the surrounding lug grooves 10 or communication grooves 12 are formed.

In the present invention, the lug grooves 10 preferably extend outward in the tire width direction, and as illustrated in FIG. 5, cross the tread edge E, extending to the buttress surface 4. At the buttress surface 4, an extended portion 10*a* of each lug groove 10 preferably bends away from the rotation direction X while extending, and as illustrated in FIGS. 1 and 3, out of the above-described ridges 5 and 6 provided on the buttress surface 4, preferably reaches the steeply inclined surface 5*a* of the ridge 5, in this case, located at the front in the rotation direction X.

In this way, as illustrated in FIGS. 1 and 3, the steeply inclined surface 5*a* that blocks the extended portion 10*a* at the tip of a bending location 10*b* of the extended portion 10*a* functions also to pack snow that is supplied from the tread surface 3 via the lug grooves 10 at the front in the rotation direction X, increasing the snow column shear force at that location and thereby further improving the on-snow traction performance.

Additionally, in the present embodiment, in a width direction extended portion 10*c* of the extended portion 10*a*, on the opposite side from the bending location 10*b*, i.e. at the back in the rotation direction X, a projecting groove portion 10*d* that projects slightly from the width direction extended portion 10*c* is formed, as illustrated in FIG. 1. As a result, the volume of snow accumulated in the extended portion 10*a* and packed at the steeply inclined surface 5*a* increases due to the increased capacity of the groove portion formed by the projecting groove portion 10*d*, thus further increasing the snow column shear force.

Note that in FIG. 1, a shallow groove 17 is provided adjacent to the concavity 7, which is the concavity further back in the rotation direction X out of the concavities 7 and 8 provided on the buttress surface 4 in the region adjacent to the tread edge E. The shallow groove 17 is provided inward from the concavity 7 in the tire radial direction and extends in the tread circumferential direction to reach the ridge 6 and the extended portion 10*a*.

REFERENCE SIGNS LIST

1: Tread
2: Sidewall
3: Tread surface
4: Buttress surface
4*a*: Concavity portion
4*b*: Portion of buttress surface
5, 6, 25, 26: Ridge
5*a*, 6*a*, 25*a*, 26*a*: Steeply inclined surface
5*b*, 6*b*, 25*b*, 26*b*: Moderately inclined surface
5*c*, 6*c*: Apex
7, 8: Concavity
9, 29: Step portion
10: Lug groove
10*a*: Extended portion of lug groove
10*b*: Bending location
10*c*: Width direction extended portion
10*d*: Projecting groove portion
11: Center rib
12: Communication groove
13: Center block
14: Intermediate block
15: Shoulder block
16: Sipe
17: Shallow groove
X: Rotation direction
E: Tread edge
C: Tire equatorial plane
A: Surface region of buttress
P1, P2: Edge point of steeply inclined surface and moderately inclined surface
$\alpha$, $\beta$: Angle of inclination of steeply inclined surface and moderately inclined surface
$\theta$: Angle of inclination of ridge

The invention claimed is:

1. A pneumatic tire used with a specified rotation direction, comprising:
   a tread;
   a pair of sidewalls extending continuously from the tread inward in a tire radial direction;
   a pair of beads continuous with the sidewalls inward in the tire radial direction; and
   at least one ridge on a buttress surface, the buttress surface extending from a tread edge of a tread surface formed on the tread to the sidewall, and the ridge extending from a sidewall side of the buttress surface towards the tread edge and terminating before reaching the tread edge; and
   at least one concavity on the buttress surface in a region adjacent to the tread edge, the concavity opening to the tread surface, being recessed from the buttress surface, and being independent from the ridge; and
   a land portion, wherein
   the ridge includes a steeply inclined surface, having a high gradient with respect to the buttress surface, inclined forwards in the rotation direction, and a moderately inclined surface, having a more moderate gradient than the steeply inclined surface, inclined backwards in the rotation direction, and
   the at least one concavity comprises a plurality of concavities separated from each other and adjacent in a tread circumferential direction, and in a region towards the tread edge from the ridge, the land portion located between the concavities adjacent in the tread circumferential direction is connected in the tread circumferential direction via a portion of the buttress surface.

2. The pneumatic tire according to claim 1, wherein the at least one ridge comprises a plurality of ridges adjacent to each other in a tread circumferential direction.

3. The pneumatic tire according claim 1, wherein when viewed in the tire radial direction, the ridge is inclined to be disposed more forward in the rotation direction at a portion of the ridge by the tread edge than in a portion of the ridge by the sidewall.

4. The pneumatic tire according claim 1, further comprising:
   a lug groove, on the tread surface, extending at an inclination with respect to a tread circumferential direction and reaching the tread edge, wherein
   the lug groove extends to the buttress surface, and at the buttress surface, an extended portion of the lug groove bends backwards in the rotation direction and reaches the steeply inclined surface of the ridge.

* * * * *